(12) United States Patent
Clavier et al.

(10) Patent No.: US 7,558,386 B1
(45) Date of Patent: Jul. 7, 2009

(54) COUNTERMEASURE METHOD IN AN ELECTRONIC COMPONENT USING A SECRET KEY CRYPTOGRAPHIC ALGORITHM

(75) Inventors: Christophe Clavier, Gémenos (FR); Jean-Sébastien Coron, Paris (FR)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 09/830,685

(22) PCT Filed: Oct. 29, 1999

(86) PCT No.: PCT/FR99/02660

§ 371 (c)(1),
(2), (4) Date: Jul. 17, 2001

(87) PCT Pub. No.: WO00/27068

PCT Pub. Date: May 11, 2000

(30) Foreign Application Priority Data

Oct. 29, 1998 (FR) .................................. 98 13605

(51) Int. Cl.
*H04K 1/00* (2006.01)
(52) U.S. Cl. ...................................... 380/29
(58) Field of Classification Search ................ 380/265, 380/21, 29, 277, 28; 726/22; 713/188
See application file for complete search history.

(56) References Cited

U.S. PATENT DOCUMENTS 5,675,649 A * 10/1997 Brennan et al. ............. 380/286
6,182,216 B1 * 1/2001 Luyster ....................... 713/168
6,278,783 B1 * 8/2001 Kocher et al. ............... 380/277
6,282,291 B1 * 8/2001 Kobayashi et al. ............ 380/43
6,490,357 B1 * 12/2002 Rose ........................... 380/265

FOREIGN PATENT DOCUMENTS

FR     2672402     8/1992

OTHER PUBLICATIONS

Miyaguchi, Shoji, "*Secret Key Ciphers that Change the Encipherment Algorithm under the Control of the Key*", NTT Review, vol. 6, No. 4, Jul. 1994, pp. 85-90.
Yi, Sun et al, "*A Method for Obtaining Cryptographically Strong 8×8 S-boxes*", IEEE 1997, Nov. 3, 1997, pp. 689-693.

\* cited by examiner

*Primary Examiner*—Matthew B Smithers
*Assistant Examiner*—Ali S Abyaneh
(74) *Attorney, Agent, or Firm*—Buchanan Ingersoll & Rooney PC

(57) ABSTRACT

In an electronic component using a secret key cryptographic algorithm, one operation utilizes a first table for supplying output data from input data. The output data, and/or derived data, is manipulated by critical instructions. A countermeasure method involves the use of other tables such that the output data and the derived data are unpredictable. The other tables are obtained from the first table by an exclusive-OR operation with a random value, or a derived random value, on one and/or the other of the input and output data of the first table.

12 Claims, 12 Drawing Sheets

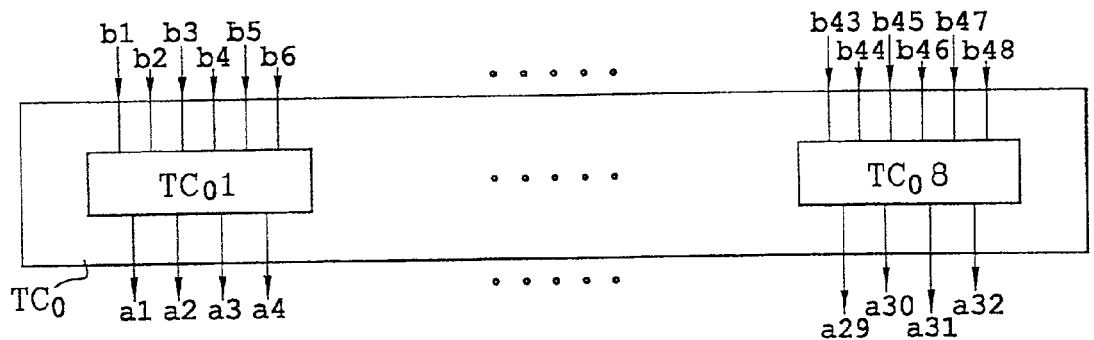
FIG.5
FIG.6
| TC$_0$ 1 | E=b1b2b3b4b5b6 | S=a1a2a3a4 |
|---|---|---|
| | 000000 | 1101 |
| | 000001 | 0101 |
| | ⋮ | ⋮ |
| | 111111 | 1010 |
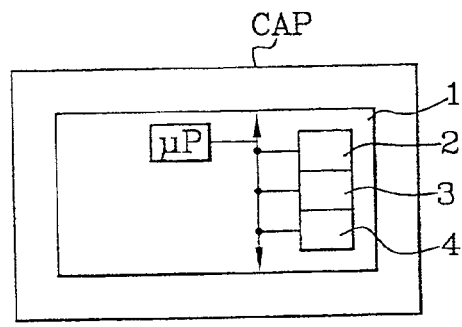
FIG.14

COUNTERMEASURE METHOD IN AN ELECTRONIC COMPONENT USING A SECRET KEY CRYPTOGRAPHIC ALGORITHM

This disclosure is based upon, and claims priority from French Application No. 98/13605, filed on Oct. 29, 1998 and International Application No. PCT/FR99/02660, filed Oct. 29, 1999, which was published on May 11, 2000 in a language other than English, the contents of which are incorporated herein by reference.

BACKGROUND OF THE INVENTION

The present invention relates to a countermeasure method in an electronic component using a secret key cryptography algorithm. They are used in applications where access to services or data is strictly controlled. They have an architecture formed around a microprocessor and memories, including a program memory which contains the secret key.

These components are notably used in chip cards, for certain applications thereof. These are for example applications involving access to certain data banks, banking applications, remote payment applications, for example for television, petrol dispensing or passing through motorway tolls.

These components or cards therefore use a secret key cryptography algorithm, the best known of which is the DES (standing for Data Encryption Standard in the British and American literature) algorithm. Other secret key algorithms exist, such as the RC5 algorithm or the COMP128 algorithm. This list is of course not exhaustive.

In general terms and briefly, the function of these algorithms is to calculate an encoded message from a message applied as an input (to the card) by a host system (server, banking dispenser etc) and the secret key contained in the card, and to supply this encoded message in return to the host system, which for example enables the host system to authenticate the component or card, to exchange data, etc.

However, it has become clear that these components or cards are vulnerable to attacks consisting of a differential analysis of the current consumption and which enable ill-intentioned third parties to find the secret key. These attacks are referred to as DPA attacks, the English acronym for Differential Power Analysis.

The principle of these DPA attacks is based on the fact that the current consumption of the microprocessor executing the instructions varies according to the data being manipulated.

Notably, an instruction from the microprocessor manipulating a data bit generates two different current profiles depending on whether this bit is "1" or "0". Typically, if the instruction is manipulating a "0", there is at this time of execution a first amplitude of the current consumed and if the instruction is manipulating a "1", there is a second amplitude of the consumed current, different from the first.

The characteristics of the cryptography algorithms are known: the calculations made, the parameters used. The only unknown is the secret key contained in the program memory. This cannot be derived solely from knowledge of the message applied as an input and the encoded message supplied in return.

However, in a cryptography algorithm, some calculated data depend only on the message applied in clear to the input of the card and the secret key contained in the card. Other data calculated in the algorithm can also be recalculated solely from the encoded message (generally supplied in clear at the output of the card to the host system) and the secret key contained in the card. More precisely, each bit of these particular data can be determined from the input or output message, and a limited number of particular bits of the key.

Thus, to each bit of a particular data item, there corresponds a sub-key formed by a particular group of bits of the key.

The bits of these particular data which can be predicted are hereinafter referred to as target bits.

The basic idea of the DPA attack is thus to use the difference in current consumption profile of an instruction depending on whether it is manipulating a "1" or a "0" and the possibility of calculating a target bit by means of the instructions of the algorithm using a known input or output message and a hypothesis on the corresponding sub-key.

The principle of the DPA attack is therefore to test a given sub-key hypothesis, applying, to a large number of current measurement curves, each relating to a known input message of the attacker, a Boolean selection function, a function of the sub-key hypothesis, and defined for each curve by the value predicted for a target bit.

By making an assumption on the sub-key concerned, it is in fact possible to predict the value "0" or "1" which this target bit will take for a given input or output message.

It is then possible to apply, as a Boolean selection function, the value, "0" or "1", predicted by the target bit for the sub-key hypothesis in question, in order to sort these curves into two packets: a first packet contains the curves which have seen the manipulation of the target bit at "0" and a second packet contains the curves which have seen the manipulation of the target bit at "1" according to the sub-key hypothesis. By taking the mean of the current consumption in each packet, a mean consumption curve $M0(t)$ is obtained for the first packet and a mean consumption curve $M1(t)$ for the second packet.

If the sub-key hypothesis is correct, the first packet actually contains all the curves amongst the N curves which have seen the manipulation of the target bit at "0" and the second packet actually contains all the curves amongst the N curves which have seen the manipulation of the target bit at "1". The mean consumption curve $M0(t)$ of the first packet will then have a mean consumption everywhere except at the times of execution of the critical instructions, with a current consumption profile characteristic of the manipulation of the target bit at "0" ($profile_0$). In other words, for all these curves, all the manipulated bits have had as many chances of equalling "0" as of equalling "1", except the target bit, which has always had the value "0". Which can be written:

$$M0(t)=[profile_0+profile_1)/2]_{t\neq tci}+[profile_0]_{tci}$$

that is to say $$M0(t)=[Vm_t]_{t\neq tci}+[profile_0]tci$$

where tci represents the critical instants, at which a critical instruction has been executed.

Likewise, the mean consumption curve $M1(t)$ of the second packet corresponds to a mean consumption everywhere except at the times of execution of the critical instructions, with a current consumption profile characteristic of the manipulation of the target bit at "1" ($profile_1$). It is possible to write:

$$M1(t)=[profile_0+profile_1)/2]_{t\neq tci}+[profile_1]_{tci}$$

that is to say $$M1(t)=[Vm_t]_{t\neq tci}+[profile_1]tci$$

It has been seen that the two profiles, $profile_0$ and $profile_1$, are not equal. The difference between the curves $M0(t)$ and $M0(1)$ then gives a signal DPA(t), whose amplitude is equal to profile$_0$-profile$_1$ at the critical instants tci of execution of the critical instructions manipulating this bit, that is to say, in the example depicted in FIG. 1, at the places tc0 to tc6, and whose amplitude is approximately equal to zero outside the critical instants.

If the sub-key hypothesis is false, the sorting does not correspond to reality. Statistically, there is then in each packet as many curves which have actually seen the manipulation of the target bit at "0" as there are curves which have seen the manipulation of the target bit at "1". The resulting mean curve M0($t$) is then situated around a mean value given by (profile$_0$+profile$_1$)/2=Vm, since, for each of the curves, all the bits manipulated, including the target bit, have as many chances of equalling "0" as of equalling "1".

The same reasoning on the second packet leads to a mean current consumption curve M1($t$) whose amplitude is situated around a mean value given by (profile$_0$+profile$_1$)/2=Vm.

The signal DP(t) supplied by the difference M0($t$)−M1($t$) is in this case substantially equal to zero. The signal DPA(t) in the case of a false sub-key hypothesis is shown in FIG. 2.

Thus the DPA attack exploits the difference in the current consumption profile during the execution of an instruction depending on the value of the bit manipulated, in order to effect a sorting of current consumption curves according to a Boolean selection function for a given sub-key hypothesis. By effecting a differential analysis of the mean current consumption between the two packets of curves obtained, an information signal DPA(t) is obtained.

A DPA attack then consists overall in:

a—drawing N random messages (for example N equal to 1000);

b—having the algorithm executed by the card for each of the N random messages, reading the current consumption curve each time (measured on the supply terminal of the component);

c—making an assumption on a sub-key;

d—predicting, for each of the random messages, the value taken by one of the target bits whose value depends only the bits of the message (input or output) and on the sub-key taken as a hypothesis, in order to obtain the Boolean selection function;

e—sorting the curves according to this Boolean selection function (that is to say according to the value "0" or "1" predicted for this target bit for each curve under the sub-key hypothesis);

f—calculating, in each packet, the resulting mean current consumption curve;

g—taking the difference between these mean curves, in order to obtain the signal DPA(t).

If the hypothesis on the sub-key is correct, the Boolean selection function is correct and the curves of the first packet actually correspond to the curves for which the message supplied as an input or output gave a target bit at "0" in the card and the curves in the second packet actually correspond to the curves for which the message applied as an input or output gave a target bit at "1" in the card.

Take the case in FIG. 1: the signal DPA(t) is therefore not zero at times tc0 to tc6 corresponding to the execution of the critical instructions (those which manipulate the target bit).

It should be noted that the attacker does not need to know precisely the critical instants. It suffices for there to have been at least one critical instant in the period of acquisition.

If the sub-key hypothesis is not correct, the sorting does not correspond to reality and there are then in each packet as many curves corresponding in reality to a target bit at "0" as there are curves corresponding to a target bit at "1". The signal DPA(t) is substantially zero everywhere (the case shown in FIG. 2). It is necessary to return to step c— and to make a new assumption on the sub-key.

If the hypothesis proves correct, it is possible to pass to the evaluation of other sub-keys, until the key has been reconstituted to the maximum possible extent. For example, with a DES algorithm, a key of 64 bits is used, of which only 56 are useful bits. With a DPA attack, it is possible to reconstitute at least 48 bits of the 56 useful bits.

SUMMARY OF THE INVENTION

The purpose of the present invention is to use, in an electronic component, a countermeasure method which gives rise to a zero signal DPA(t), even where the sub-key hypothesis is correct.

In this way, nothing makes it possible to distinguish the case of the correct sub-key hypothesis from the false sub-key hypotheses. By means of this countermeasure, the electronic component is protected against DPA attacks.

However, in the invention, it was realised that it did not suffice to take steps so that the signal DPA(t) is zero relative to a given target bit.

This is because, if the value taken by several target bits of the same data item manipulated by the critical instructions is considered, it will be necessary to sort the curves not into two packets, but into several packets. There is no longer a binary selection function. It can be shown that, by next grouping these packets in one way or another, it is possible to obtain a non-zero signal DPA(t) in the case of a correct sub-key hypothesis, whereas it would have been zero if it had been sorted according to a binary selection function on a single target bit.

Take for example two target bits of the same data item. These two target bits can take the following $2^2$ values: "00", "01", "10" and "11".

By applying the selection function to the N=1000 current consumption curves measured, four packets of curves are obtained. If the sorting is correct, a first packet of approximately 250 curves corresponds to the value "00", a second packet of approximately 250 curves corresponds to the value "01", a third packet of approximately 250 curves corresponds to the value "10" and a fourth packet of approximately 250 curves corresponds to the value "11".

If the first and fourth packets are grouped together in a first group and the second and third packets in a second group, two groups are obtained which are not equivalent.

In the first group, the two bits have as many chances of equalling "00" as of equalling "11". The mean value at the critical instants of all the consumption curves of this group can be written:

$$M1(t_{ci}) = [\text{consumption}("00") + \text{consumption}("11")]/2$$

In the second group, the two bits have as many chances of equalling "01" as of equalling "10". The mean value at the critical instants of all the consumption curves of this group can be written:

$$M2(t_{ci}) = [\text{consumption}("01") + \text{consumption}("10")]/2$$

If the difference is taken between these two averages, a non-zero signal DPA(t) is obtained. In other words, the two groups whose mean consumptions are compared do not have equivalent contents.

In the invention, it has therefore been sought to prevent the obtaining of any significant signal within the meaning of the DPA attack. Whatever the number of target bits taken, whatever the combination of packets made to effect a comparison of the mean consumptions, the signal DPA(t) will always be zero. It is therefore necessary to obtain equivalent packets, whatever the number of target bits considered.

One solution to these different technical problems has been found in the use of a random value in an exclusive OR operation with one or other or both of the input and output data of means used in the algorithm.

With a use according to the invention of such a random value, the data manipulated by the critical instructions becomes unpredictable whilst having a correct result at the output of the algorithm.

As characterised, the invention therefore concerns a countermeasure method in an electronic component using a secret key cryptographic algorithm, the use of the algorithm comprising the utilisation of first means for supplying an output data item from an input data item, the output data item and/or derived data being manipulated by means of critical instructions. According to the invention, the countermeasure method provides for the use of other means, so that the output data item and the derived data are unpredictable, these other means being obtained from the said first means by an exclusive OR operation with a random value or a random value derived from one or other or both of the input and output data of the said first means.

BRIEF DESCRIPTION OF THE DRAWINGS

Other characteristics and advantages of the invention are detailed in the following description given for information and in no way limitatively, and with reference to the accompanying drawings, in which:

FIG. 5 is a block diagram of the operation SBOX used in the DES algorithm;

FIG. 6 shows an example of an elementary table of constants with one input and one output used in the operation SBOX;

FIG. 14 depicts a simplified block diagram of a chip card containing an electronic component in which the countermeasure method according to the invention is implemented.

DETAILED DESCRIPTION

Figure 1:
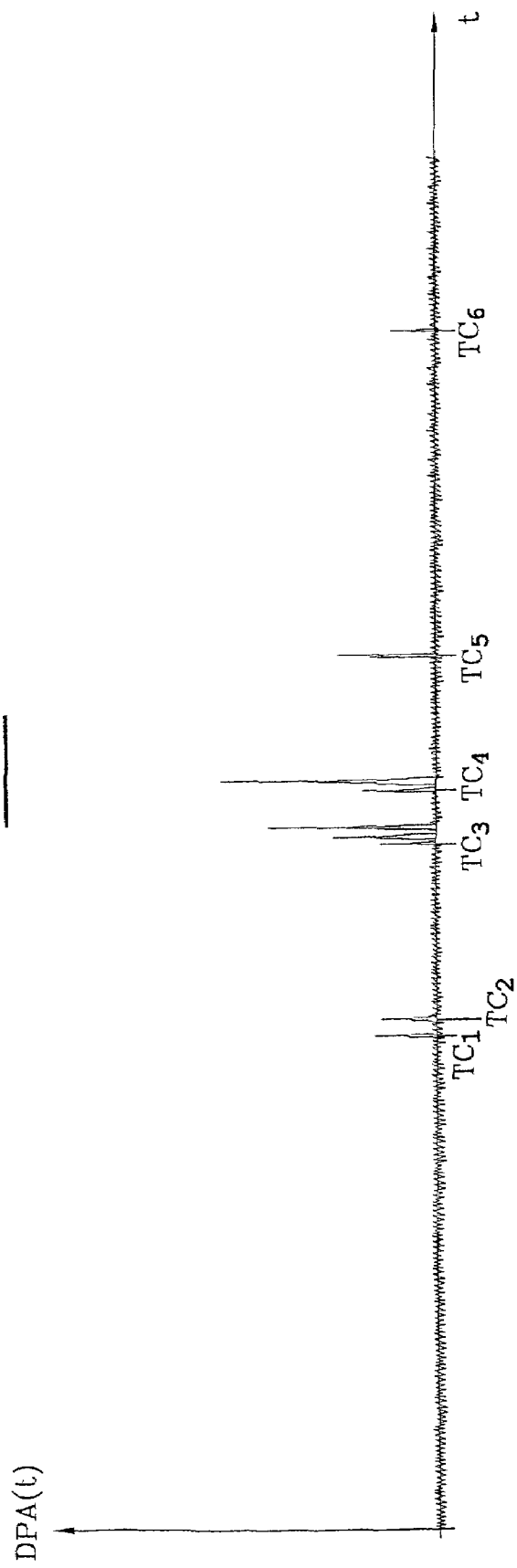
FIGS. 1 and 2, already described, depict the signal DPA(t) which can be obtained as a function of a hypothesis on a sub-key of the secret key K, according to a DPA attack.
Figure 2:
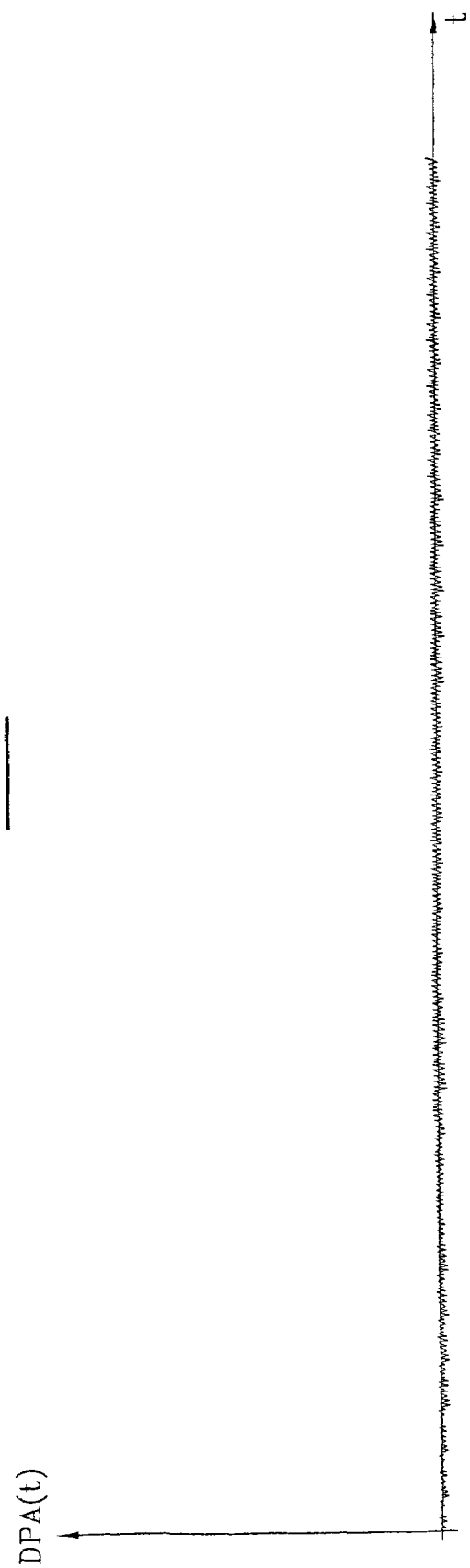
Figure 3:
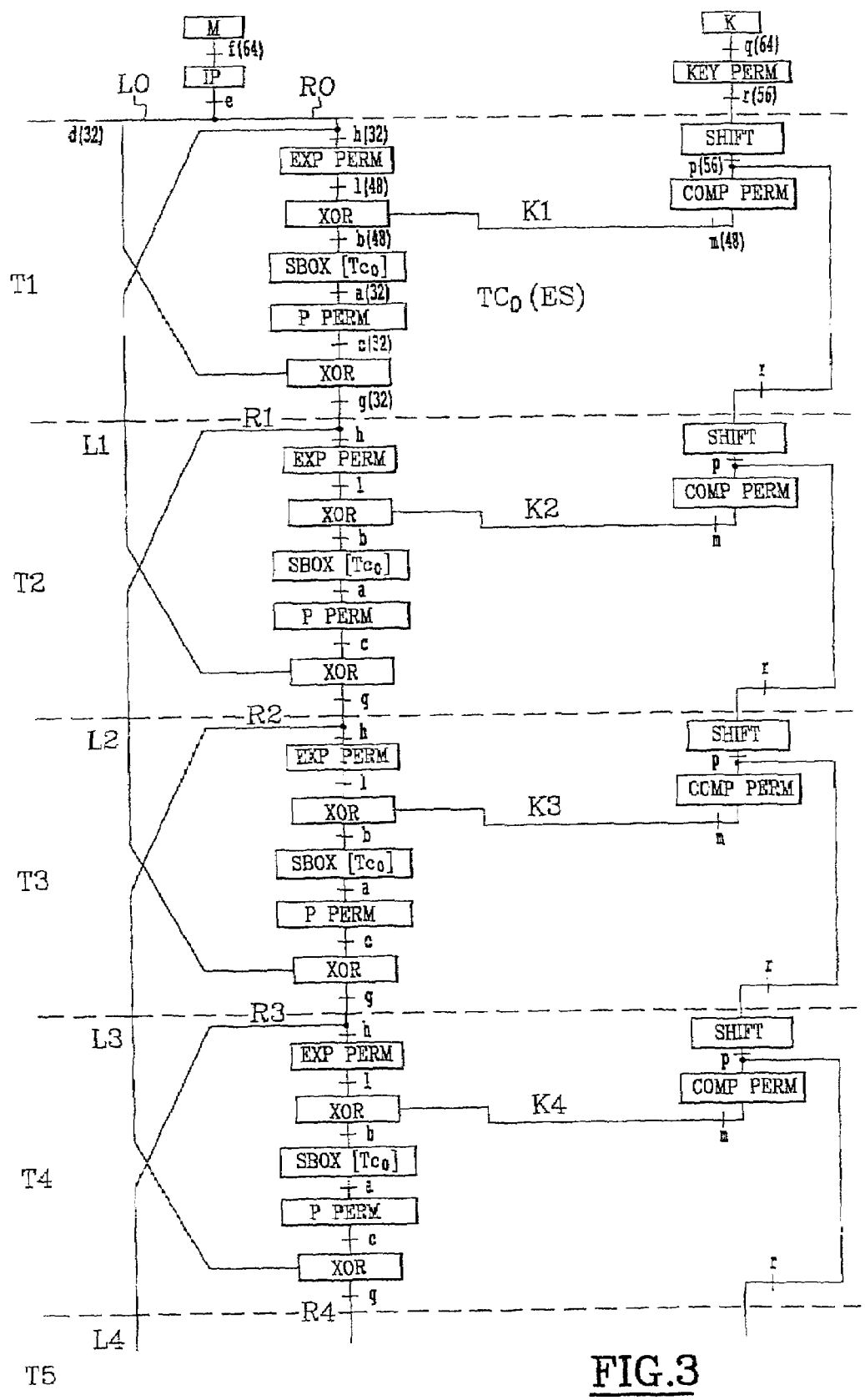
FIGS. 3 and 4 are flow diagrams depicting the first rounds and the last rounds of the DES algorithm.
Figure 4:
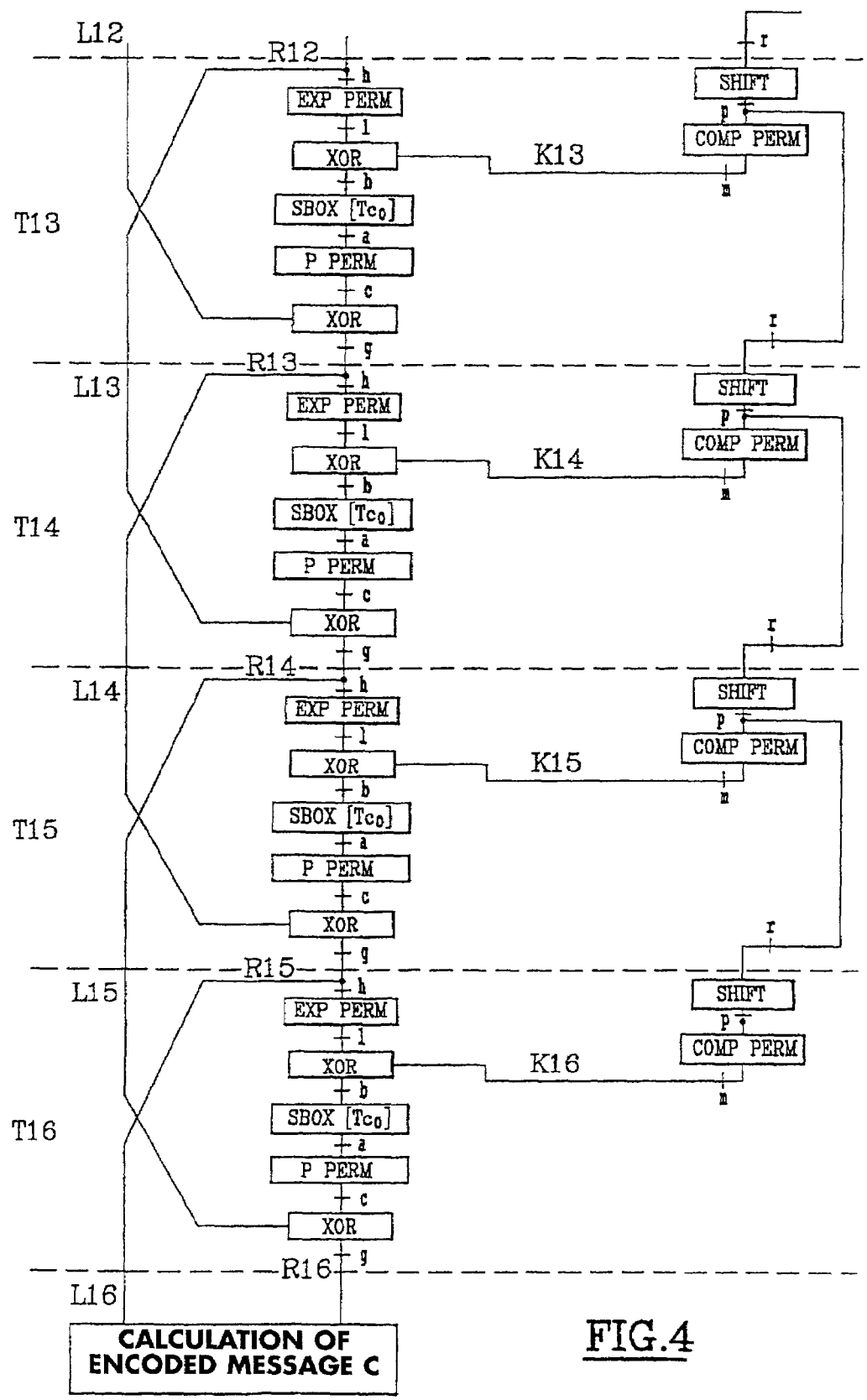

The DES secret key cryptographic algorithm (hereinafter the term DES or DES algorithm will more simply be used) contains 16 calculation rounds, denoted T1 to T16, as depicted in FIGS. 3 and 4.

The DES begins with an initial permutation IP on the input message M (FIG. 3). The input message M is a word f of 64 bits. After permutation, a word e of 64 bits is obtained, which is divided into two in order to form the input parameters L0 and R0 of the first round (T1). L0 is a word d of 32 bits containing the 32 most significant bits of the word e. R0 is a word h of 32 bits containing the 32 least significant bits of the word e.

The secret key K, which is a word q of 64 bits, itself undergoes a permutation and compression in order to supply a word r of 56 bits.

The first round comprises an operation EXP PERM on the parameter R0, consisting of an expansion and a permutation, in order to supply a word 1 of 48 bits as an output.

This word 1 is combined with a parameter K1, in an operation of the exclusive OR type denoted XOR, in order to supply a word b of 48 bits. The parameter K1, which is a word m of 48 bits, is obtained from the word r by a shift by one position (the operation denoted SHIFT in FIGS. 3 and 4) followed by a permutation and a compression (the operation denoted COMP PERM).

The word b is applied to an operation denoted SBOX, at the output of which a word a of 32 bits is obtained. This particular operation will be explained in more detail in relation to FIGS. 5 and 6.

The word a undergoes a permutation P PERM, giving as an output the word c of 32 bits.

This word c is combined with the input parameter L0 of the first round T1, in a logic operation of the exclusive OR type, denoted XOR, which supplies the word g of 32 bits as an output.

The word h (=R0) of the first round supplies the input parameter L1 of the following round (T2) and the word g of the first round supplies the input parameter R1 of the following round. The word p of the first round supplies the input r of the following round.

Other rounds T2 to T16 take place in a similar fashion, except with regard to the shift operation SHIFT, which takes place on one or two positions according to the rounds in question.

Each round Ti thus receives as an input the parameters Li−1, Ri−1 and r and supplies as an output the parameters Li and Ri and r for the following round Ti+1.

At the end of the DES algorithm (FIG. 4), the encoded message is calculated from the parameters L16 and R16 supplied by the last round T16.

This calculation of the encoded message C comprises in practice the following operations:

formation of a word e' of 64 bits by reversing the position of the words L16 and R16, and then concatenating them;

application of the permutation $IP^{-1}$ which is the reverse of that of the start of the DES, in order to obtain the word f' of 64 bits forming the encoded message C.

The operation SBOX is detailed in FIGS. 5 and 6. It comprises a table of constants $TC_0$ for supplying an output data item a as a function of an input data item b.

In practice, this table of constants $TC_0$ is in the form of eight elementary tables of constants $TC_01$ to $TC_08$, each receiving as an input only 6 bits of the word b, in order to supply only 4 bits of the word a as an output.

Thus the elementary table of constants $TC_01$ depicted in FIG. 6 receives, as an input data item, the bits b1 to b6 of the word b and supplies as an output data item the bits a1 to a4 of the word a.

In practice these eight elementary tables of constants $TC_01$ to $TC_08$ are stored in the program memory of the electronic component.

In the operation SBOX of the first round T1, a particular bit of the output data item a of the table of constants $TC_0$ depends on only 6 bits of the data item b applied as an input, that is to say only 6 bits of the secret key K and the input message (M).

In the operation SBOX of the last round T16, a particular bit of the data item a output from the table of constants $TC_0$ can be recalculated from only six bits of the secret key K and the encoded message (C).

However, if the principle of the DPA attack is repeated, if a bit of the output data item a is chosen as the target bit, it suffices to make an assumption on 6 bits of the key K, in order to predict the value of a target bit for a given input (M) or output (C) message. In other words, for the DES, it suffices to make an assumption on a sub-key of 6 bits.

In a DPA attack on such an algorithm for a given set of target bits issuing from a given elementary table of constants, it is therefore necessary to distinguish one correct sub-key hypothesis amongst 64 possible ones.

Thus, from the output bits of the eight elementary tables of constants $TC_01$ to $TC_08$, it is possible to discover up to 8×6=48 bits of the secret key, by making DPA attacks on corresponding target bits.

In the DES, critical instructions in the sense of DPA attacks are therefore found at the start of the algorithm and at the end.

At the start of the DES algorithm, the data which can be predicted from an input message M and from a sub-key hypothesis are the data a and g calculated in the first round (T1).

The data item a from the second round T1 (FIG. 3) is the output data item from the operation SBOX of the round in question. The data item g is calculated from the data item a, by permutation (P PERM) and exclusive OR operation with the input parameter L0.

In fact, the data item c of the first round is a data item derived from the data item a of the first round. The derived data item c corresponds to a simple permutation of bits of the data item a.

The data item l of the first round is a data item derived from the data item g of the first round, since it corresponds to a permutation of the bits of the word g, certain bits of the word g also being duplicated.

Knowing a and g, it is also possible to know these derived data.

The critical instructions of the start of the algorithm are the critical instructions which manipulate either the data item which can be predicted, such as the data item a or the data item g of the first round, or a derived data item.

The critical instructions manipulating the data item a of the first round T1 or the derived data item c are thus the instructions for the end of the operation SBOX, of the operation P PERM and the start of the operation XOR of the first round T1.

The critical instructions manipulating the data item g or the derived data are all the instructions of the end of the operation XOR of the end of the first round T1 as far as the instructions for the start of the operation SBOX of the second round T2, and the instructions for the start of the XOR operation at the end of the third round T3 (L2=h(T2)=g(T1)).

At the end of the DES algorithm, the data which can be predicted from an encoded message C and a sub-key hypothesis are the data item a of the sixteenth round T16 and the data item L15 equal to the word h of the fourteenth round T14.

The critical instructions manipulating the data item a of the sixteenth round or derived data are the instructions of the sixteenth round of the end of the operation SBOX, of the permutation operation P PERM and of the start of the operation XOR.

For the data item L15, the critical instructions manipulating this data item or derived data are all the instructions from the instructions of the end of the operation XOR of the fourteenth round T14, up to the instructions for the start of the operation SBOX of the fifteenth round T15, plus the instructions for the start of the operation XOR of the sixteenth round T16.

The countermeasure method according to the invention applied to this DES algorithm consists in making each of the data manipulated by the critical instructions unpredictable. Thus, whatever the target bit or bits used, the signal DPA(t) will always be zero.

With regard to the application of the countermeasure method according to the invention to the DES algorithm, it is therefore necessary to apply the countermeasure to the critical instructions for the start of the DES and to the critical instructions for the end of the DES, in order to be completely protected.

In the DES, all the data manipulated by critical instructions are an output item or data derived from an output data item from an operation SBOX.

This is because, at the start of the DES, the data which can be predicted are the data a and g of the first round T1. The data item a is the output data item of the operation SBOX of the first round. The data item g is calculated from the data item a, since g=P PERM(a) XOR L0. g is therefore a data item derived from the output data item a of the operation SBOX of the first round. Thus all the data manipulated by the critical instructions of the start of the DES result directly or indirectly from the output data item a of the operation SBOX of the first round.

With regard to the end of DES, the data which can be predicted are the data item a of the sixteenth round T16 and the data item g of the fourteenth round T14, g being equal to L15.

The data item a is the output data item of the operation SBOX of the sixteenth round T16.

As for the data item L15, this is calculated, in the normal execution of the DES algorithm, from the output data item a of the operation SBOX of the fourteenth round T14: L15=P PERM(a) XOR L14.

If the output data a of these particular operations SBOX are made unpredictable, all the derived data are also made unpredictable: all the data manipulated by the critical instructions of the DES algorithm are therefore made unpredictable. If it is considered that these operations SBOX constitute first means for supplying an output data item S=a from an input data item E=b, the countermeasure method applied to the DES algorithm consists in using other means for making the output data item unpredictable, so that this output data item and/or derived data manipulated by the critical instructions are all unpredictable.

These other means can include different means. They are calculated from the first means by applying an exclusive OR with a random value or a random value derived from one or other or both of the input and output data items of the first means.

The use of this random value is such that the result output, that is to say the encoded message, remains correct.

Figure 7:
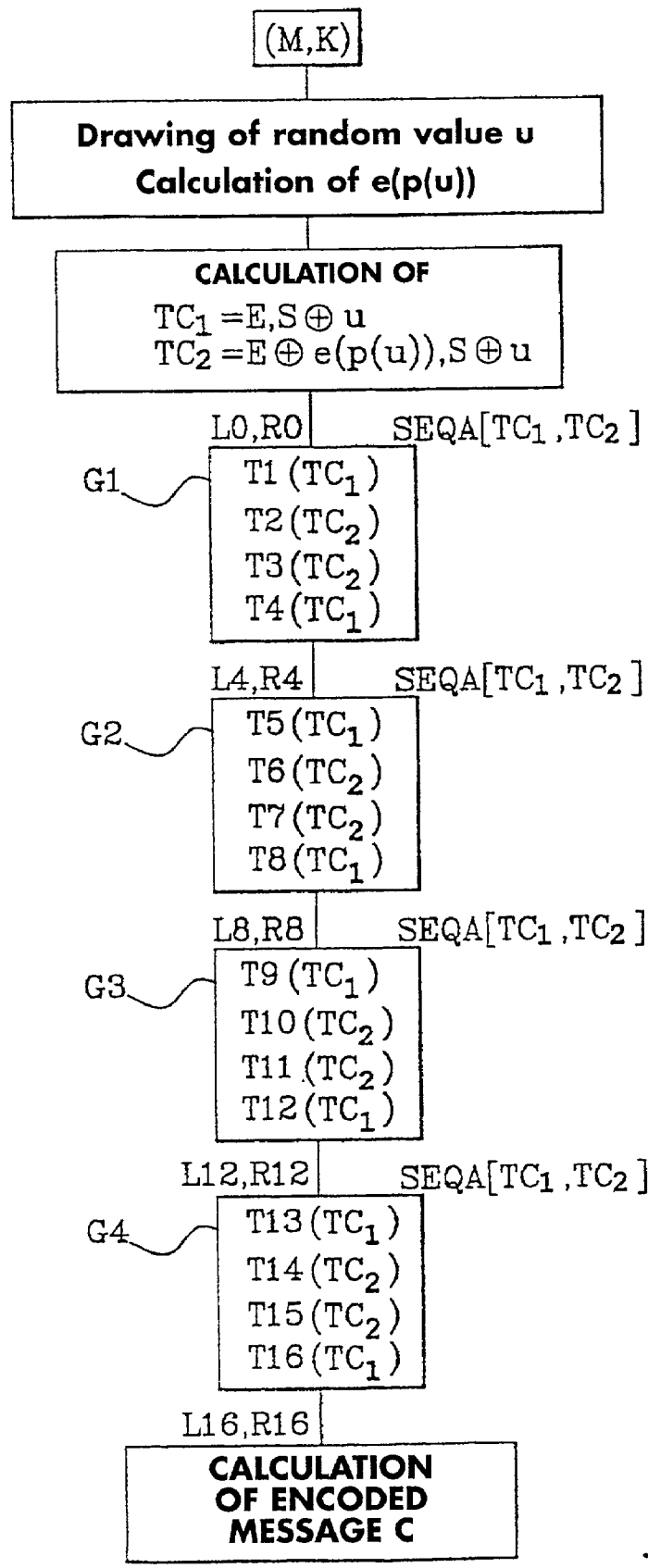
FIG. 7 shows a first example of a flow diagram for executing the DES with a countermeasure method according to the invention.

FIG. 7 depicts a first embodiment of the invention. In this embodiment, the sixteen rounds of the DES algorithm are divided into four groups G1 to G4 of four successive rounds. The group G1 thus comprises the rounds T1 to T4, the group G2 the rounds T5 to T8, the group G3 the rounds T9 to T12 and the group G4 the rounds T13 to T16.

In a conventional execution of the DES algorithm, it has been seen that each round comprises the use of first means $TC_0$ in an operation SBOX.

In the first mode of application of the countermeasure method, other means are calculated by doing an exclusive OR with a random value u and/or with a derived value e(p(u)) on one or other or both of the input and output data of the first means $TC_0$. Then an identical execution sequence SEQA is applied to each group, which consists of using these other calculated means.

According to the invention, a random value u is used which is a data item of 32 bits. It is for example possible to draw a random value of 32 bits, or else draw a random value of 4 bits and copy them 8 times in order to obtain the random value u in 32 bits.

The derived variable equal to e(p(u)) is then calculated, where p(u) corresponds to the result of the operation P PERM applied to the value u and where e(p(u)) is the result of the operation EXP PERM applied to the value p(u).

It is then possible to calculate the other means used in the invention.

In the example depicted with reference to FIG. 7, these other means comprise second means $TC_2$ and third means $TC_1$.

The second means $TC_2$ are used in the second round and the penultimate round of each group; that is to say in T2, T3 of G1, T6, T7 of G2, T10, T11 of G3 and T14 and T15 of G4.

The second means $TC_2$ are calculated by applying an exclusive OR with the derived random variable e(p(u)) to the input data item E and by applying an exclusive OR with the random value u to the output data item S of the first means $TC_0$, which can be written: $TC_2 = (E \oplus e(p(u)), S \oplus u)$.

The third means $TC_1$ are used in the first round and the last round of each group. That is to say in T1, T4 of G1, T5, T8 of G2, T9, T12 of G3 and T13, T16 of G4.

The third means $TC_1$ are calculated by applying an exclusive OR with the random variable u to the output data item S of the first means $TC_0$, which can be written; $TC_1 = (E, S \oplus u)$.

The calculation program then consists, at the start of execution of the algorithm, in drawing a random value u, in the example in 4 bits, calculating the derived random variable e(p(u)), and then calculating the different means used in the execution sequence SEQA. In the example, it is necessary to calculate the second and third means $TC_2$ and $TC_1$.

The correct result for the output parameters is obtained at the output of each group. Thus the output parameters L4 and R4 of the first group G1, L8 and R8 of the second group G2, L12 and R12 of the third group G3, L16 and R16 of the fourth group G4 are correct whatever the random variable drawn.

When all the rounds have been effected, the correct parameters L16 and R16 are obtained, which will make it possible to calculate the correct encoded message C.

Figure 8:
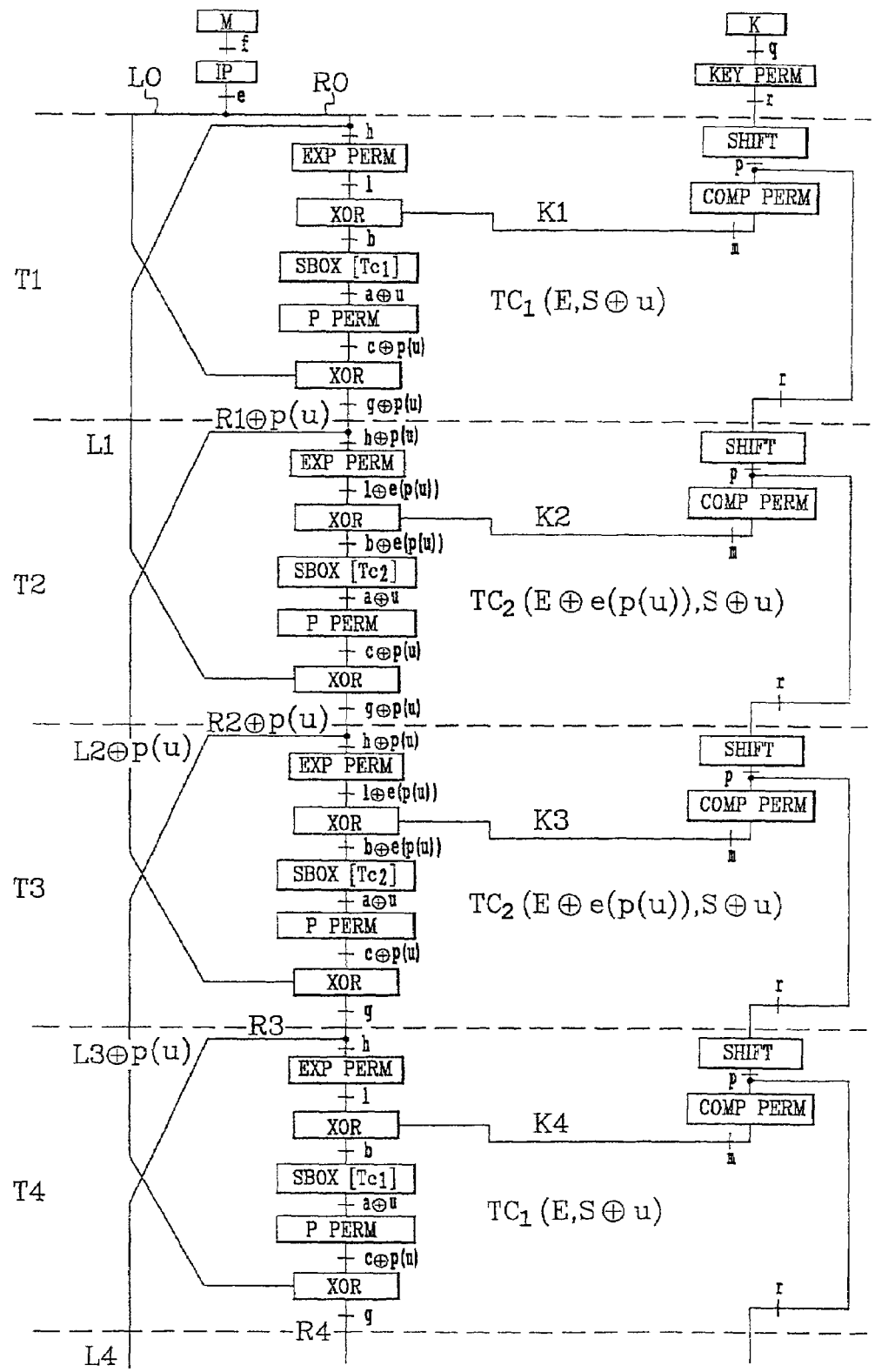
FIG. 8 is a flow diagram of the first rounds of the corresponding DES.

On the other hand, within the groups, certain intermediate results do not have the same values according to the sequence used, but values corresponding to the exclusive OR operation with the random value u or with the derived random value e(p(u)), as will be shown with reference to FIGS. 3 and 8.

FIG. 8 shows the detailed flow diagram of the four rounds T1, T2, T3 and T4 of the first group G1, in the execution sequence SEQA according to the invention.

In this sequence, the round T1 uses the third means $TC_1$. At the output of the operation SBOX, the randomly modified data item $a \oplus u$ (FIG. 8) is therefore obtained, in spite of the data item a according to the normal sequence of the DES, that is to say without countermeasure (FIG. 3).

With the execution sequence SEQA according to the invention, the operation P PERM of the first round T1, which is a simple permutation, will therefore also supply as an output a randomly modified data item equal to $c \oplus p(u)$.

The data item which is obtained by the XOR operation between a data item $c \oplus (u)$ and the data item L0 will also supply as an output a randomly modified data item $g \oplus p(u)$.

This data item applied to the operation EXP PERM will supply as an output the randomly modified data item denoted $l \oplus e(p(u))$.

Thus, with the third means $TC_1$ of the round T1, all the following randomly modified data are obtained:

in round T1: $a \oplus u$, $c \oplus p(u)$, $g \oplus p(u)$;

in round T2: $R1 \oplus p(u)$, $h \oplus p(u)$, $l \oplus e(p(u))$, $b \oplus e(p(u))$;

in round T3: $L2 \oplus + p(u)$.

The second means $TC_2$ used in the round T2 are then arrived at. According to their definition: $E \oplus e(p(u))$, $S \oplus u$, by applying as an input the randomly modified data item $b \oplus p(u)$, the randomly modified data item $a \oplus u$ is obtained as an output. By taking this reasoning as far as the end of the round T4, and by noting that $p(u) \oplus (p(u)=0$, the non-modified data L4, R4 are obtained at the output of the round T4.

In addition, it is found that, for all the critical instructions for the start of the DES, the critical instructions will manipulated data modified in a random fashion.

With such a countermeasure method, it is necessary to provide, at the start of the DES, the drawing of the random value u and the calculation of the means used in the execution sequence SEQA. These means, calculated at each execution of the DES, are stored, for the execution time, in the working memory, the first means $TC_0$ which serve for the calculation being for their part stored in the program memory.

Returning to FIG. 7, it can be noted that there is no need for a countermeasure in the middle groups G2 and G3, since they do not contain any critical instructions within the meaning of a DPA attack. It would therefore be possible to apply the execution sequence SEQA of the countermeasure method only to the first and last group G1 and G4. It would then suffice to use the first means ($TC_0$) in the groups G2 and G3.

However, applying the countermeasure method to all the groups gives coherence to the whole.

Figure 9:
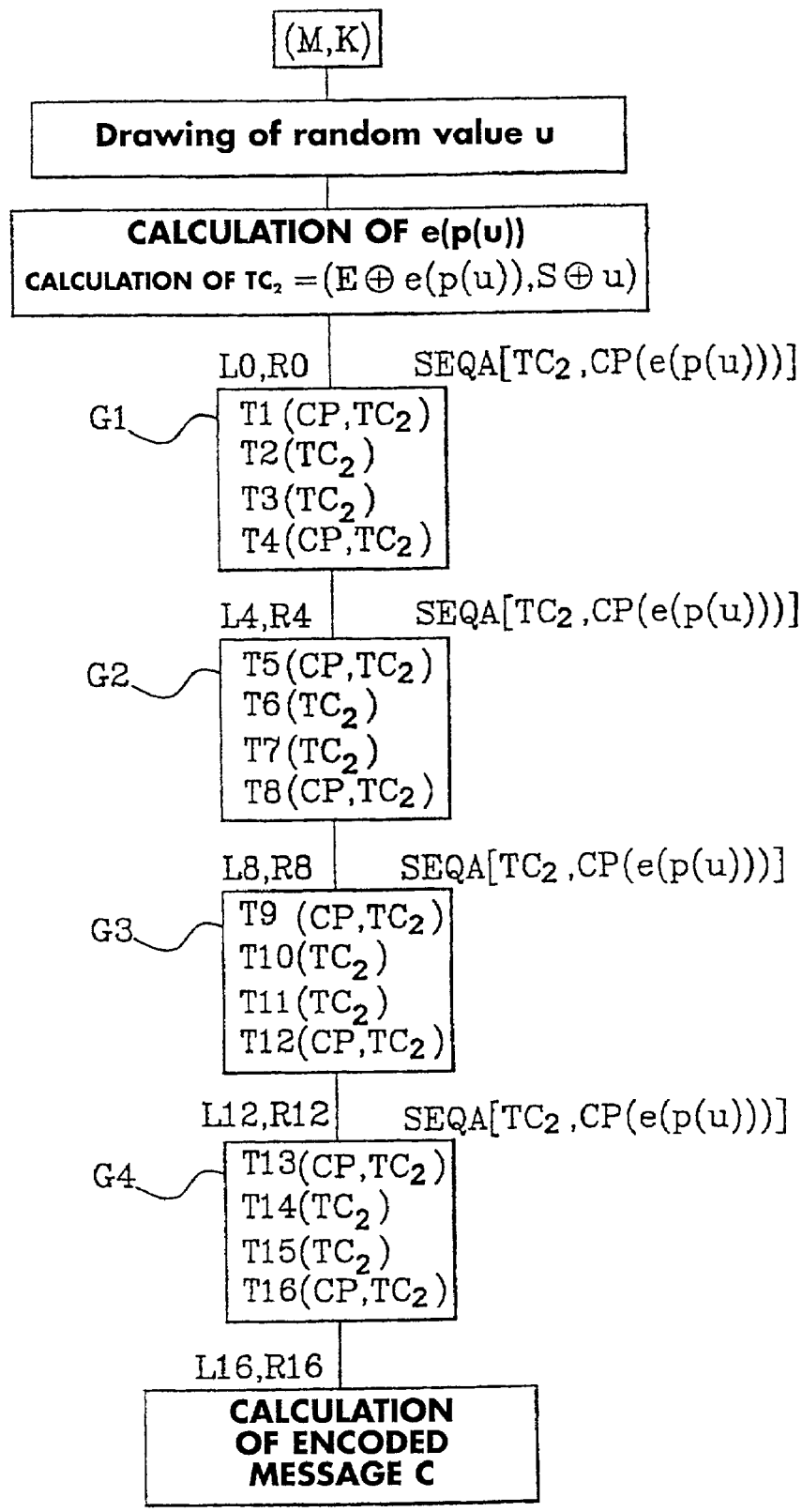
FIGS. 9 and 10 depict respectively a flow diagram for execution of the DES and a detailed flow diagram of the first rounds, in a second mode of application of the countermeasure method according to the invention.

Thus the sequence SEQA is applied to each of the groups G1 to G4. A second embodiment of the countermeasure method is depicted in FIG. 9. This second embodiment is in fact a variant of the first.

The advantage of this variant is that it uses, as other means in the sequence SEQA, only the second means $TC_2$. This is because it has been seen that the different means $TC_0$, $TC_1$, $TC_2$ correspond in practice to tables of constants each comprising eight elementary tables of constants, which it is necessary to recalculate with regard to the means $TC_1$ and $TC_2$ at each new execution of the DES, and to keep in working memory.

Figure 10:
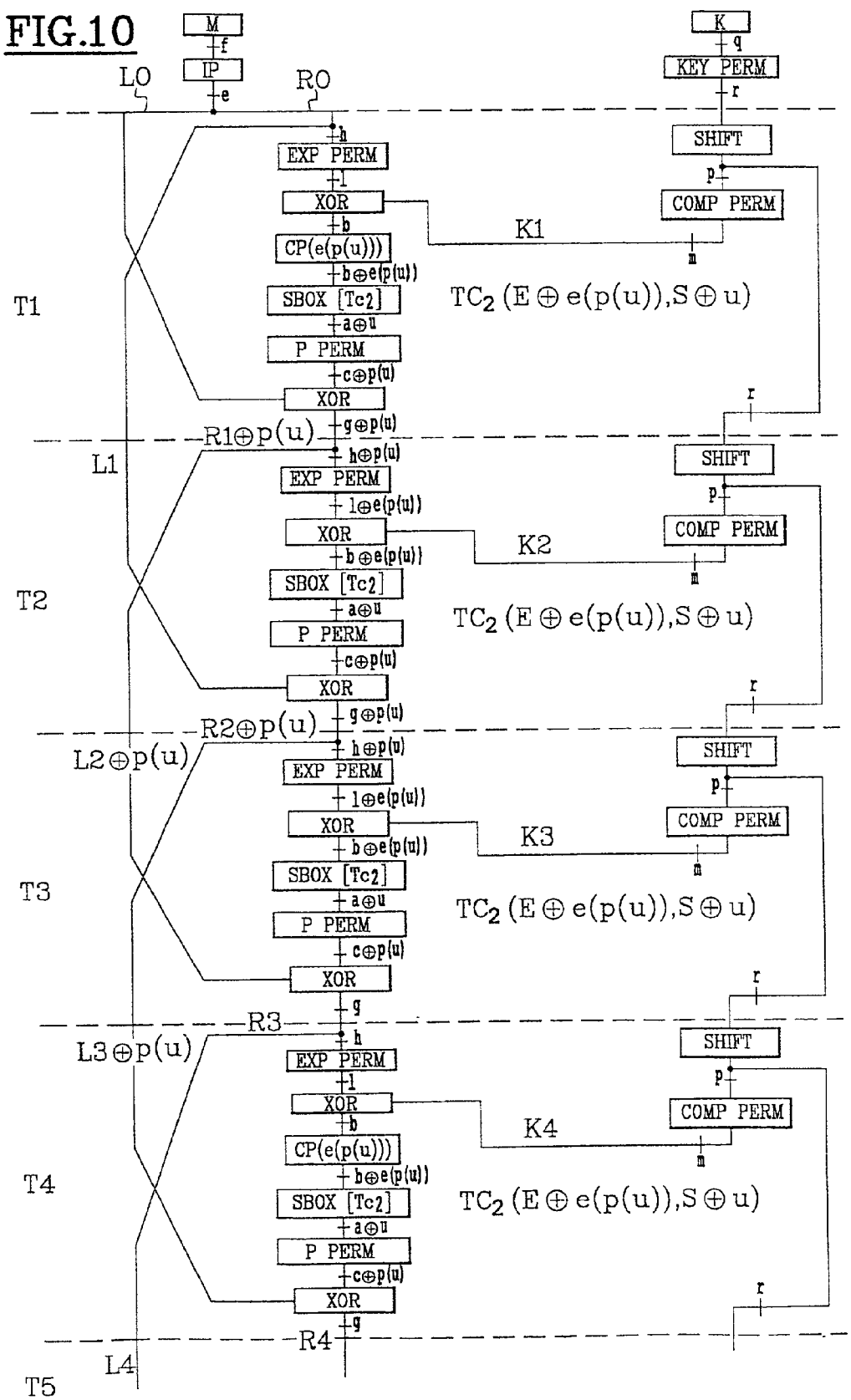

This variant therefore consists in using only the second means $TC_2$ in the sequence SEQA. For this purpose, in the program for calculating the first and second rounds of each group, an additional exclusive OR operation CP with the derived random variable e(p(u)) is provided, in order to obtain, at the input of the second means, the data item $b \oplus e(p(u))$. This operation is denoted CP(e(p(u))) in the figures. If FIG. 10 is referred to, depicting the detailed flow diagram of the sequence SEQA of execution of the four rounds T1 to T4 of the first group G1, it is therefore a case of applying, at the input of the operation SBOX of the rounds T1 and T4, a variable $b \oplus e(p(u))$. The additional operation CP plus the second means $TC_2$ are equivalent to the third means $TC_1$ used in the first embodiment of the invention.

Calculation time is saved there, since the operation CP is executed only twice in one group, that is to say eight times for a complete SEQA sequence on the four groups, whilst the calculation of a table requires carrying out this information $b \oplus e(p(u))$ for all the input data of this table.

It will be noted that the additional exclusive OR operation CP with the variable e(p(u)) can be positioned at various places in the first and last rounds, that is to say between the operation EXP PERM and the operation XOR or between the operation XOR and the operation SBOX.

It can also be remarked that it is possible to use an additional exclusive OR operation CP with the derived random variable p(u) placing this additional operation CP(p(u)) before the operation EXP PERM. l⊕e(p(u)) is obtained as an output, and therefore there will next be b⊕e(p(u)).

In all cases, the data item b⊕e(p(u)) is obtained at the input of the operation SBOX.

Figure 11:
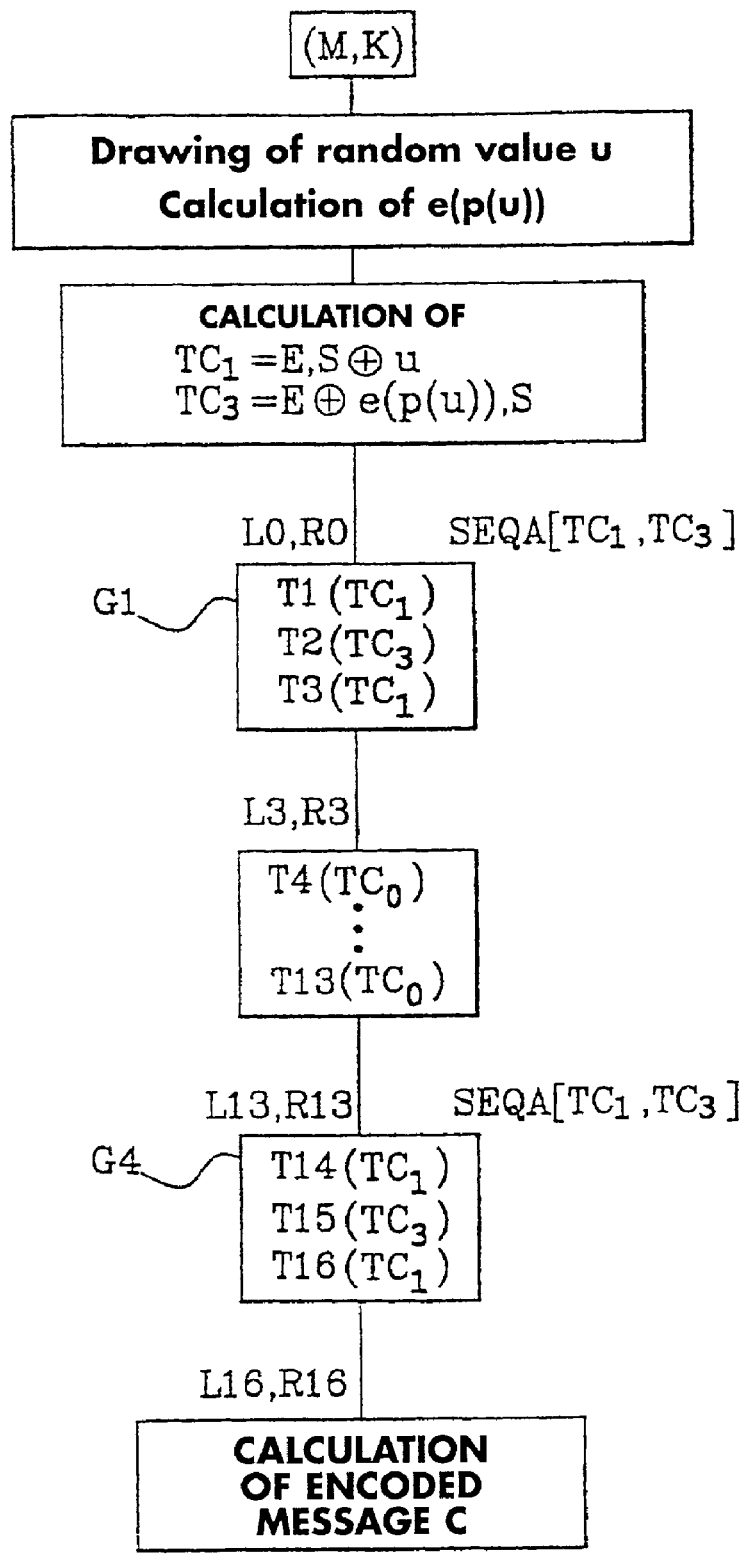
FIGS. 11 and 12 correspond to a third mode of application of the countermeasure method according to the invention.

FIG. 11 depicts a third example embodiment of a countermeasure method according to the invention.

In this embodiment, a first group G1 is formed with the first three rounds T1, T2, T3 and another group G4 with the last three rounds T14, T15, T16. The execution sequence SEQA is applied to each group with the other means for at least some rounds.

For the other rounds not included in the groups, that is to say for rounds T4 to T13, the first means $TC_0$ are applied.

At the output of each group G1, G4, the correct result is obtained at the output L3, R3 and L16, R16, whatever the random variable u drawn.

The other means are, in the example, the third means $TC_1$ already seen in relation to the first embodiment and fourth means $TC_3$.

These fourth means are calculated with respect to the first means $TC_0$ by applying an exclusive OR to the input data item E, with the derived random variable e(p(u)).

Thus, after having drawn the random variable u, and having calculated the derived random variable, the different means used in the execution sequence SEQA are calculated. Then this sequence SEQA is applied to the first group. The parameters L3, R3 are obtained as an output. The following rounds T4 to T3 are executed with the first means $TC_0$. At the end of the round T13, the sequence SEQA is applied to the group G4. The parameters L16, R16 are obtained, which will serve to calculate the encoded message C.

Figure 12:
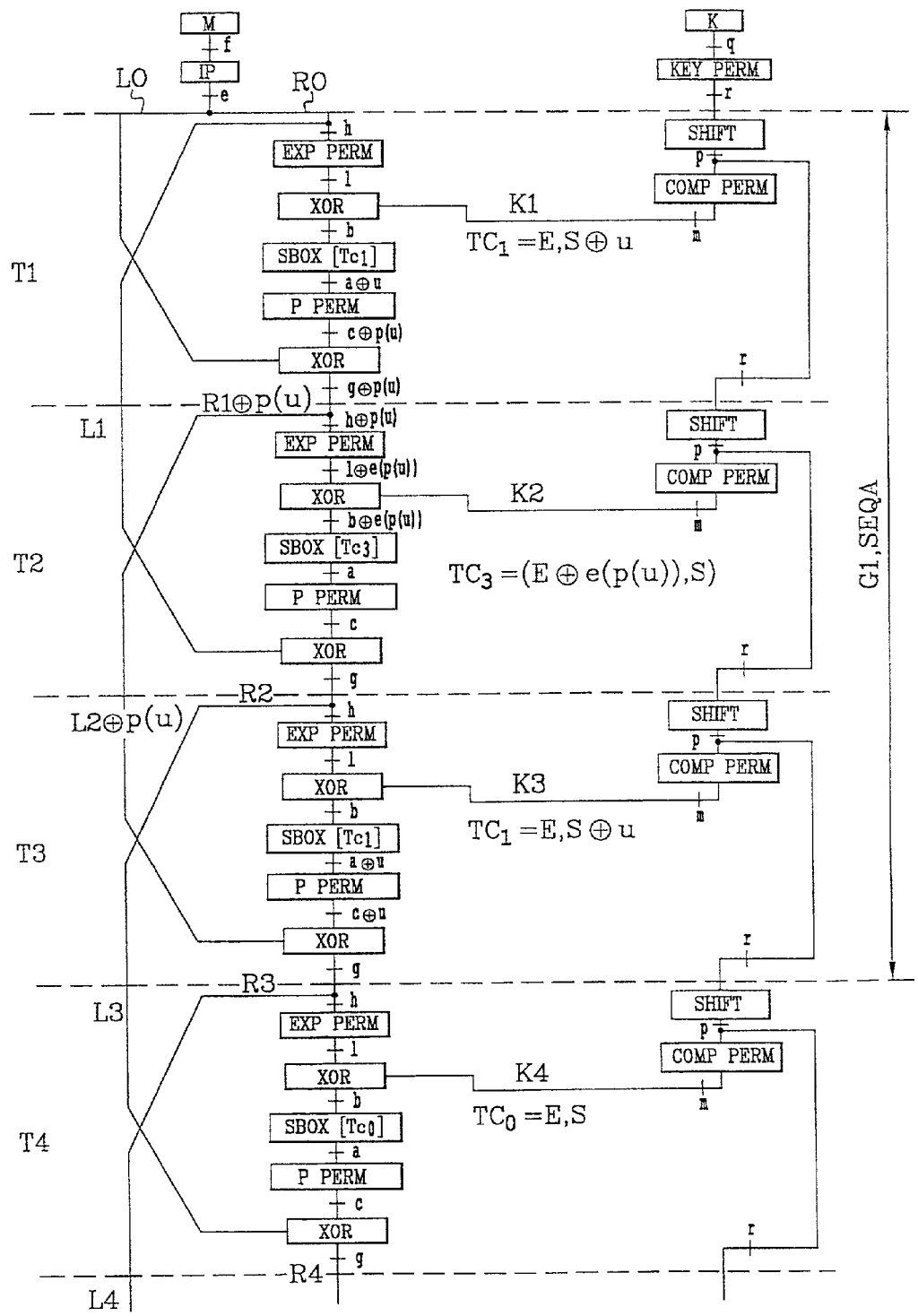

FIG. 12 is a corresponding detailed flow diagram.

It is clear in this flow diagram that randomly modified data are obtained for all the critical instructions of these rounds. The data L3 and R3 of the output of the third round are not modified, which makes it possible to continue the execution of the algorithm, passing to the round T4, at which the first means $TC_0$ are applied according to the normal execution of the algorithm.

In this figure, it can be remarked that, in the operation SBOX of the third round T3, it would be possible to use the first means $TC_0$ in place of the third calculated means $TC_1$, by providing an additional exclusive OR operation CP at the output of the operation SBOX, in order to make an exclusive OR of the output with the random variable u, in order to obtain the data item a⊕u at the input of the operation XOR. This is an equivalent solution.

Figure 13:
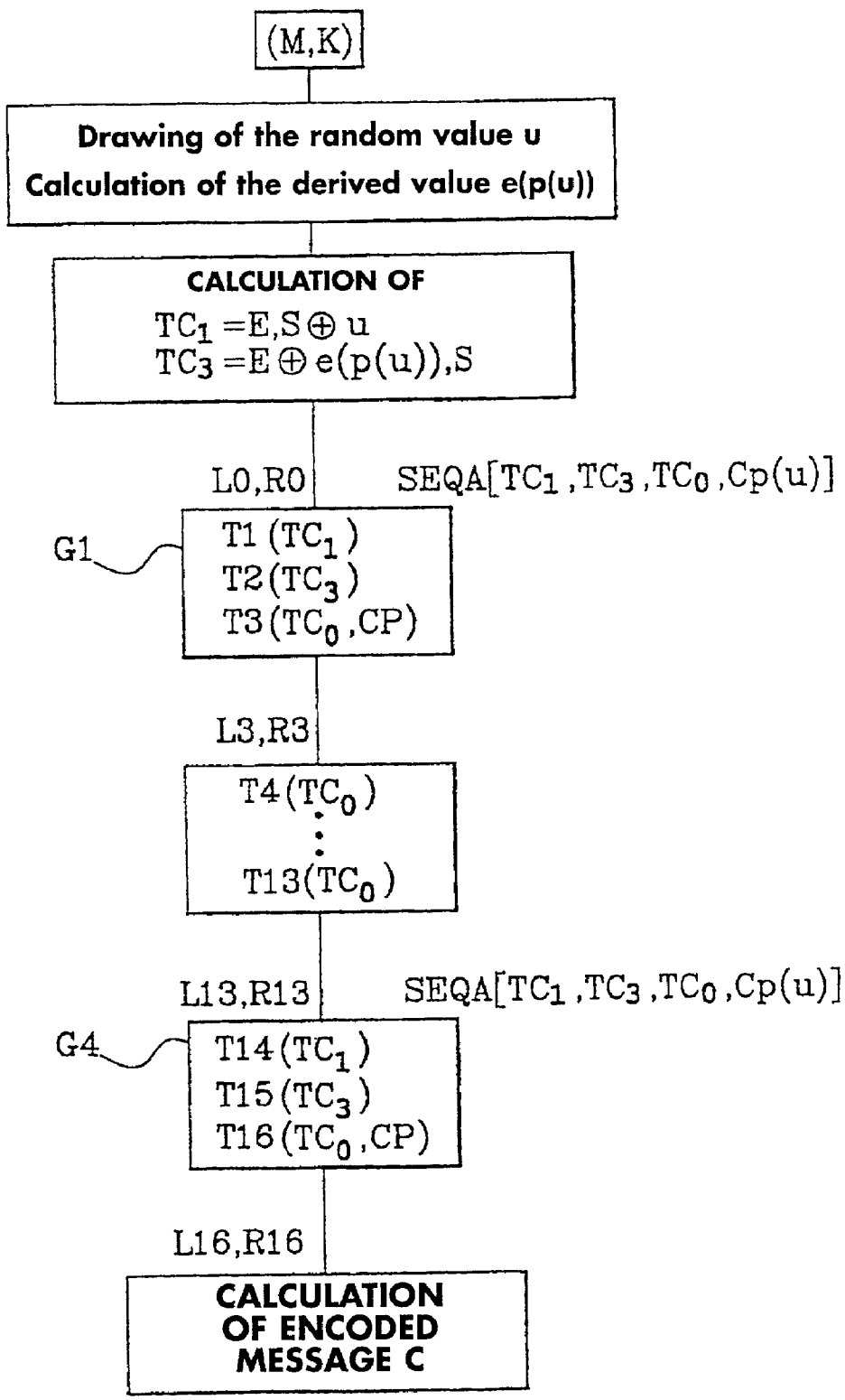
FIG. 13 depicts a flow diagram for execution of the DES in a variant of the third mode of application.

FIG. 13 shows an execution flow diagram using this variant. For the third round in the two groups G1 and G4, use is made, in the execution sequence SEQA, of the first means $TC_0$ followed at the output of the additional exclusive OR instruction with the variable u, which is denoted T3($TC_0$, CP(u)).

In general terms, in the countermeasure method according to the invention, it is therefore possible to provide, in the execution sequence SEQA and for one or more rounds, an additional exclusive OR instruction CP at the input or output of the means used with the variable u or a derived random variable p(u) or e(p(u)) according to circumstances.

The present invention applies to the DES secret key cryptography algorithm, for which several examples of non-limitative application have been described. It applies more generally to a secret key cryptography algorithm with sixteen calculation rounds, whose critical instructions are situated amongst the instructions of the first three or last three rounds.

An electronic component 1 implementing a countermeasure method according to the invention in a DES secret key cryptography algorithm typically comprises, as shown in FIG. 10, a microprocessor μP, a program memory 2 and a working memory 3. In order to be able to manage the use of the different means $TC_0$, $TC_1$, $TC_2$ according to the invention, which are, in practice, tables of constants stored in program memory, means 4 of generating a random value between 0 and 1 are provided which, if reference is made to the flow diagrams in FIGS. 7 and 11, will supply the random value u at each execution of the DES. Such a component can in particular be used in a chip card 5, in order to improve its resistance to tampering.

The invention claimed is:

1. A countermeasure method in an electronic component using a cryptographic algorithm that comprises multiple successive rounds of operation with a secret key, wherein at least one of said rounds is implemented with a first manipulation means for supplying an output data item from an input data item, and the output data item is manipulated by means of instructions, and wherein at least one other round of said algorithm is implemented with other manipulation means for supplying output data, so that the output data item is unpredictable, said other manipulation means being obtained from said first manipulation means by performing an exclusive OR operation on said first manipulation means with a random value, and wherein each round using manipulation means for supplying an output data item from an input data item, the output data item being manipulated by instructions in at least a first three rounds and at least a last three rounds, and wherein said method includes the steps of forming a first group comprising at least the first three rounds and another group comprising at least the last three rounds, and implementing the first group and the last group with an execution sequence using the other manipulation means in at least some rounds.

2. A countermeasure method according to claim 1, wherein four groups each of four successive rounds are formed, and said execution sequence is applied at least to the first group and to the last group.

3. A countermeasure method according to claim 2, wherein said sequence is executed in each of the groups.

4. A countermeasure method according to claim 1, wherein said execution sequence is applied to a first group formed from the first three rounds and to a last group formed by the last three rounds.

5. A countermeasure method according to claim 1, wherein each execution of the algorithm includes the steps of drawing a random value and calculating said other manipulation means.

6. A countermeasure method according to claim 1 wherein said manipulation means are tables of constants.

7. A countermeasure method according to claim 1 wherein said manipulation means are used in combination with an additional exclusive OR operation with a value based upon the random value.

8. The method of claim 1 wherein said random value is derived from one or both of the input and output data of said first manipulation means.

9. An electronic security component having a countermeasure against attacks on a secret key cryptography technique in which data is manipulated during multiple successive rounds of a cryptography algorithm, said component comprising:

a program memory having stored therein a first manipulating means that produces an output value from an input value;

means for generating a random value, means for calculating at least one other manipulating means by combining said first manipulating means with said random value, and a processor that executes said cryptography algorithm using said first manipulating means during some of said multiple rounds and said other manipulating means during other rounds of said algorithm, wherein each round using the manipulating means that produces an output value from an input value, the output value being manipulated by instructions in at least a first three rounds and at least a last three rounds, said algorithm further comprising the steps of forming a first group comprising at least the first three rounds and another group comprising at least the last three rounds, and implementing the first group and the last group with an execution sequence using the manipulating means in at least some rounds.

10. The electronic security component of claim 9, wherein said first and said other manipulating means each comprise a table of constants.

11. The electronic security component of claim 9, wherein said cryptography technique comprises a DES algorithm that is executed in multiple rounds.

12. The electronic security component of claim 9, wherein said component is a chip card.

\* \* \* \* \*